United States Patent [19]
Temme

[11] 3,715,025
[45] Feb. 6, 1973

[54] SCRAPER CHAIN CONVEYORS AND SCRAPER ELEMENTS

[75] Inventor: Helmut Temme, Waltrop, Germany

[73] Assignee: Gewerkschaft Eisenhutte Westfalia, Westfalia, Germany

[22] Filed: Jan. 11, 1971

[21] Appl. No.: 105,570

[30] Foreign Application Priority Data

June 20, 1970 Germany..................G 70 23 248.3
Dec. 15, 1970 Great Britain....................59485/70

[52] U.S. Cl................................................198/171
[51] Int. Cl................................................B65g 19/00
[58] Field of Search.....................198/168–175, 204

[56] References Cited

UNITED STATES PATENTS 1,917,134  7/1933  Levin..................................198/171

FOREIGN PATENTS OR APPLICATIONS 1,580,223  5/1969  France..................................198/171
1,273,464  7/1968  Germany...............................198/168
1,487,285  5/1967  France..................................198/168

Primary Examiner—Richard E. Aegerter
Attorney—Roberts, Cushman & Grover

[57] ABSTRACT

A scraper element for a scraper chain conveyor of the type having sigma-shaped side walls connected by a base wall and two chains moved along the center region of the base wall. The element is guided at its ends in guide channels defined by the inner parts of the side walls and including the inner faces of the upper flanges of the side walls. The upper surface of the scraper elements near each of its ends which is disposed facing one of the aforesaid inner faces is composed of a number of, preferably three, adjoining portions inclined at different angles to the base wall with the angle of inclination of said portions increasing outwardly of the element.

1 Claim, 2 Drawing Figures

PATENTED FEB 6 1973

3,715,025

INVENTOR
HELMUT TEMME
BY
Roberts Cushman & Grover
ATTORNEY

SCRAPER CHAIN CONVEYORS AND SCRAPER ELEMENTS

BACKGROUND TO THE INVENTION

The present invention relates generally to scraper chain conveyors and more particularly to scraper elements for use in such conveyors.

In scraper chain conveyors a chain or chains to which scraper elements are attached can be disposed at the center of the conveyor or else two chains can be arranged at the sides of the conveyor. Where the chain or chains are disposed at the center of the conveyor considerable difficulty has hitherto been encountered in properly guiding the ends of the scraper elements in guide channels formed by the sigma-shaped side walls of the conveyor and this is particularly the case where the conveyor is intended to be adaptable and usable with chains disposed at the sides of the conveyor. With a central chain or chains and where the conveyor takes a curved course any of the scraper elements can be displaced when foreign bodies become jammed between one of the side walls of the conveyor defining a guide channel and the facing end of the scraper element. The scraper element affected in this way is then no longer at right angles to the side walls of the channel and this means that the ends of the scraper element are not properly guided in the guide channels. Normally the scraper elements have upper boundary surfaces which face corresponding surfaces of the guide channels formed by the inner faces of the upper flanges of the side walls and the aforesaid displacement of the scraper element adversely effects the area of coverage or potential contact provided between these surfaces since it can give rise to a mere linear or even punctiform contact between the surfaces, resulting in a correspondingly high degree of wear.

It is to be understood that the term potential contact or coverage is used since during operation there is usually only periodic contact between those surfaces of the guide channels and the scraper elements and such contact depends upon the working conditions that prevail.

A general object of the invention is to provide an improved scraper element for use in scraper chain conveyors.

A further object of the invention is to provide a scraper element which will retain a sufficient area of potential contact with the inside of the guide channels, thus precluding undue wear, even when the element is pivoted out of the transverse position to a considerable extent.

SUMMARY OF THE INVENTION

In one aspect the invention provides a scraper element for use in scraper chain conveyors; said element having an upper surface near each of its ends which is formed by at least two adjoining portions inclined at different angles relative to the horizontal longitudinal central plane of the element with the portion disposed outermost from the center of the element being inclined at the greatest angle.

In another aspect, in a scraper chain conveyor of the type comprising two sigma-shaped side walls, a base wall extending between said side walls, one or more chains adapted to move along the central region of said base wall and a series of scraper elements attached to the chains with their ends disposed in guide channels formed by the inside of said walls including the inner faces of the upper flanges thereof; the invention consists of forming the upper surface near each end of each scraper element which extends partly beneath one of the upper flanges from at least two adjoining portions inclined at different angles to the base wall with the outermost portion being inclined at the greatest angle.

Preferably the inclination of the portions decreases as the portions approach the center of the element.

The aforementioned inclined portions moves alongside and, in operation contacts from time to time, the inner face of the upper flange defining the associated guide channel as long as the scraper element adopts its normal position, i.e., transversally of the guide channels. This also applies where the conveyor takes a curved course. If, however, a small foreign body, such as a stone, becomes jammed between one of the side walls defining one of the guide channels and the associated end of one of the scraper elements the body will cause the scraper to pivot horizontally. A gradually increasing gap is then formed between the side wall and the scraper element through which the foreign body can eventually pass. With this comparatively limited pivotal movement the position of the scraper element in relation to the side walls and in particular to the upper flanges of the latter changes from the original perpendicular position to an acute angle. However by constructing the scraper elements in accordance with the invention, the outermost inclined portion of the upper surface of the scraper element is no longer primarily engageable with the inner face of the upper flange of the side wall but the next adjacent portion inclined less steeply takes over this function and if the pivotal movement is greater still then possibly the following portion may come into operation. At all events, an adequate area of potential contact between the scraper element and the inner faces of the upper flanges is preserved because the angle of inclination on the inner face of the upper flanges as viewed in the longitudinal direction of the pivoted scraper, is likewise correspondingly smaller.

The invention may be understood more readily, and various other features of the invention may be understood more readily from consideration of the following description.

BRIEF DESCRIPTION OF DRAWINGS

A constructional embodiment of the present invention will now be described, by way of example only, with reference to the accompanying drawing.

DESCRIPTION OF PREFERRED EMBODIMENT

Figure 1:
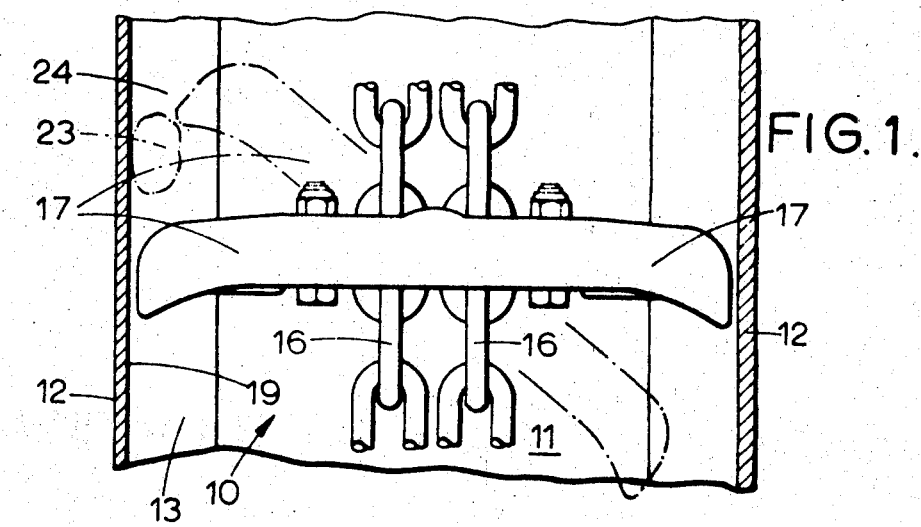
FIG. 1 is a plan view of part of a conveyor employing scraper elements made in accordance with the invention.
Figure 2:
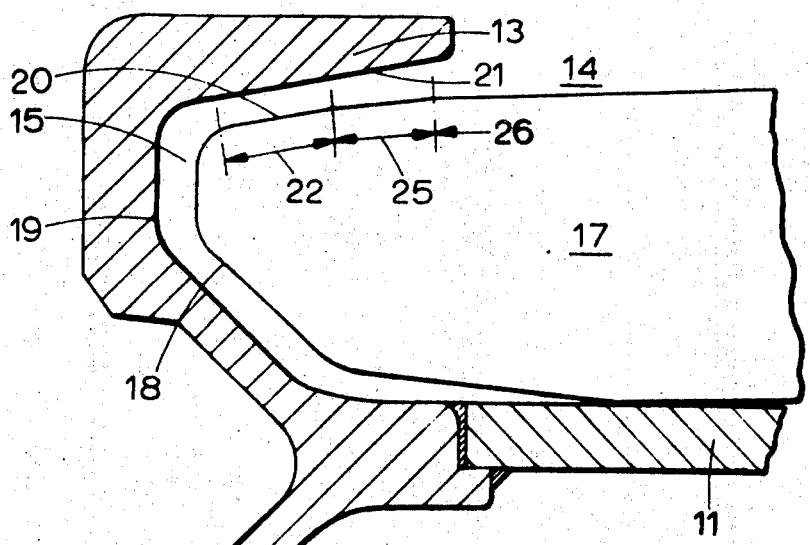
FIG. 2 is an enlarged cross sectional view of part of the conveyor showing the formation of one of the scraper elements.

As shown in the drawing, the conveyor, generally designated 10, has in known manner a base wall 11 attached to two sigma-shaped side walls 12. The side walls 12 each have upper flanges 13 which define the upper region of a guide channel 14 within which is circulated the outer ends of scraper elements 17 spaced apart and attached to two centrally disposed chains 16. The lower edges of the scraper elements 17 are in scraping relationship with the upper surface of the wall 11 whereas nominally a gap 15 is formed between the inner face 19 of the walls 12 and the flange 13 and the opposite surfaces 18, 20 of the elements 17. During conveying, however, contact occurs between the surfaces so that the scraper elements 17 are guided in the channels 14. The scraper elements 17 are substantially perpendicular to the chains 16 and to the side walls 12 provided that the conveyor itself takes a reasonably straight and smoothly curved course and provided that the scraper elements do not become displaced from this position by some obstacle. If, on the other hand, the conveyor takes a sharply curved course then the end surfaces 18 of the scraper elements 17 can engage the corresponding surfaces 19 of the side wall 12, more or less continuously. Similarly, any vertical angular movement of the scraper elements 17 about the longitudinal axis of the well 11, caused for example by a layer of coal dust on the base wall 11, can result in engagement between the surfaces 20 of the scraper elements 17 and the inner faces 21 of the flanges 13.

In accordance with the invention the upper surfaces 20 of the scraper elements are each formed by adjoining inclined portions 22, 25, 26. It is arranged that during normal operation it is only the portions of each scraper element 17 designated 22, which extend parallel to the inner faces 21 of the flanges 13, that can engage the faces 21. If, as shown in FIG. 1, some foreign body, such as a small stone 23, becomes jammed between the surfaces 18, 19 then the scraper element 17 in question is caused to perform a horizontal pivoting movement about the longitudinal axis of the wall 11. This movement will continue until the gap 24 (FIG. 1) is wide enough to allow passage to the foreign body 23. When this has taken place the tension of the pertinent chain 16 will cause the scraper element 17 to swing back again into its initial position. During the pivotal movement of the scraper element 17 its angular position in relation to the inner face 21 of each of the flanges 13 would undergo a change. More particularly, as the scraper element 17 assumes an acute angle in relation to the longitudinal center of the face 21 then the face along which the upper surface 20 of the scraper element 17 is disposed will be inclined at a somewhat smaller angle than that of the portion 22. In order to ensure an adequate area of coverage or potential contact between the overall upper surface 20 of the scraper element 17 and the face 21, the upper surface 20 of the scraper element 17 also has a second portion 25 which adjoins the portion 22 and a further portion 26 which adjoins the portion 25. The portion 25 is inclined at a correspondingly smaller angle than that of the portion 22 and likewise the portion 26 is inclined at a correspondingly smaller angle in relation to the portion 25. In this example, the portion 26 continues up to the center of the scraper element 17. The portion 26 can however extend as far as the nearest of the two chains 16.

As a rule these three successive portions 22, 25 and 26 disposed at the upper outermost ends of the scraper elements, will be sufficient to ensure that the overall upper surface 20 of the scraper elements 17 will always have an ample area of coverage or contact relative to the inner faces 21 of the flanges 13. If necessary, just two such portions may suffice and conversely more than three portions may be provided.

It is not necessary for the aforementioned portions 22, 25 and 26, to be effectively divided from one another by sharp transition points and the portions 22, 25 and 26 can merge to form an almost continuous arc.

I claim:

1. In a scraper chain conveyor comprising two sigma-shaped side walls with upper and lower inwardly directed flanges, a base wall extending between said side walls, guide channels formed at the inside of said side walls and defined by surfaces including the inner faces of the flanges, and inner side faces of the walls, at least one chain disposed to move along a central region of the base wall and a series of scraper elements attached to said at least one chain with end parts disposed wholly within said guide channels, the scraper elements each having endmost linear surfaces each disposed in confronting parallel relationship to the associated inner side face of the associated side wall; the improvement comprising forming the upper surface, remote from the base wall, of each scraper element at each end part thereof with surface portions inclined at different angles to the base wall, said surface portions at each end part of each scraper element including one continuous portion extending with constant inclination from a region at or near the center of the element to a region within the associated flange of the associated side wall, an outermost portion inclined at a greater angle than said one portion and extending up to and merging with the associated endmost surface of the element over a curved corner transition region, the outermost portion being disposed parallel to the inner face of the associated flange and an intermediate portion disposed between said one portion and said outermost portion to confront said inner face of the associated flange, the intermediate portion being inclined at a greater angle than said one portion and at a smaller angle than said outermost portion, whereby angular displacement of any of the scraper elements about the central region of the base wall can cause one of the portions of the upper surface of the element to contract the inner face of the associated flange of the associated side wall over a substantial area.

* * * * *